Nov. 10, 1953

W. C. DAVIS ET AL 2,658,620

SEPARATION OF LIQUID FROM SOLIDS

Filed March 19, 1948

INVENTORS
Walter C. Davis
Wilmer H. Bath
by
Attorneys

INVENTORS
Walter C. Davis
BY Wilmer H. Bath
Attorneys

Nov. 10, 1953     W. C. DAVIS ET AL     2,658,620
SEPARATION OF LIQUID FROM SOLIDS
Filed March 19, 1948     5 Sheets-Sheet 5

INVENTORS
Walter C. Davis
Wilmer H. Bath
BY
Attorneys

Patented Nov. 10, 1953

2,658,620

UNITED STATES PATENT OFFICE 2,658,620

SEPARATION OF LIQUID FROM SOLIDS

Walter C. Davis, Tredyffrin Township, Chester County, and Wilmer H. Bath, West Conshohocken, Pa., assignors to The Sharples Corporation, a corporation of Delaware Application March 19, 1948, Serial No. 15,776

4 Claims. (Cl. 210—67)

This invention relates to the separation of solids from a liquid and especially to the continuous separation of finely divided crystalline materials from a liquid in which they are suspended.

The invention is particularly applicable to centrifugal machines having a rotor with a perforated wall in which periodic separations of mother liquor from suspended solids are performed. Normally, these machines are operated in cycles comprising loading and centrifugally separating liquid from solids, rinsing and drying the separated solids, and unloading the separated solids. Previous inventions have supplied means for automatic operation of a centrifugal machine in performing each of these steps rapidly and in proceeding immediately to the next step as soon as a particular step is sufficiently near completion. An example of such a centrifugal machine and system is shown in Patent 2,271,493 to Brewer.

In an embodiment of the machine shown in the Brewer patent a charge is delivered to the machine through a charge control valve which remains open throughout the loading period and closes practically instantaneously at the termination of this period. While the machine is loading it is also separating liquid from solids and walling up the latter to form a wall of progressively increasing thickness in the rotor, and concurrently with these operations, liquid is being separated and discharged from the machine. When the wall of solids in the rotor attains a predetermined thickness, the charge control valve closes, and at this time the separation of liquid from the solids of the supplied charge has been practically completed. After completion of the separation, the solids are then rinsed and dried and a dislodging tool or scraper is advanced toward the wall of the rotor to cut away the solids, which are removed from the rotor as they are dislodged by the scraper.

A factor present in the use of centrifugal machines of the type described has been their inability to operate continuously for long periods of time while separating liquid from solids satisfactorily. Normally, the effectiveness of the separation in these machines decreases with an increase of the number of cycles of operation because of the clogging or coating of the perforated wall.

It is a feature of the present invention to provide a method and system by means of which the separating efficiency of a centrifugal machine of the perforated rotor or basket type is maintained high for a very great number of cycles of continuous operation; the progressive decrease in separating efficiency has been avoided.

Another feature of the invention is the provision of a system of controlling the cycle of operation of a centrifugal machine of the type described to predetermine the length of time required in certain of the various steps as selected by the operator who is then freed from labor as the machine repeats the established cycle a great number of times. Changes in the timing of certain of the steps of the cycle are easily made without shut-down, a matter of importance when the composition of the incoming mixture or other conditions vary to such an extent as to make such changes desirable.

Since it is frequently desirable to recover the mother liquor from which solids are separated in a centrifugal machine, means are provided to prevent contamination of this liquor with other liquids which may be used to wash the solids in the bowl or basket or to dislodge solids from the perforated wall of the rotor. Control of the operation of this means is handled by the same system which controls the steps of the centrifugation cycle; an additional burden is thus removed from the operator.

Additional features and objects of the invention will be apparent from the following specification and the attached drawings, in which.

While the invention may be applied to centrifugal machines of many types, for simplicity and clarity several modifications of the invention will be described as applied to the centrifugal machine of the type shown in Figs. 1 and 2.

More particularly, it will be understood that the principles of the invention are applicable to any centrifugal machine which has a perforated wall through which liquid may be discharged, and that features of the invention are applicable to many types of centrifugal machines.

Figure 1:
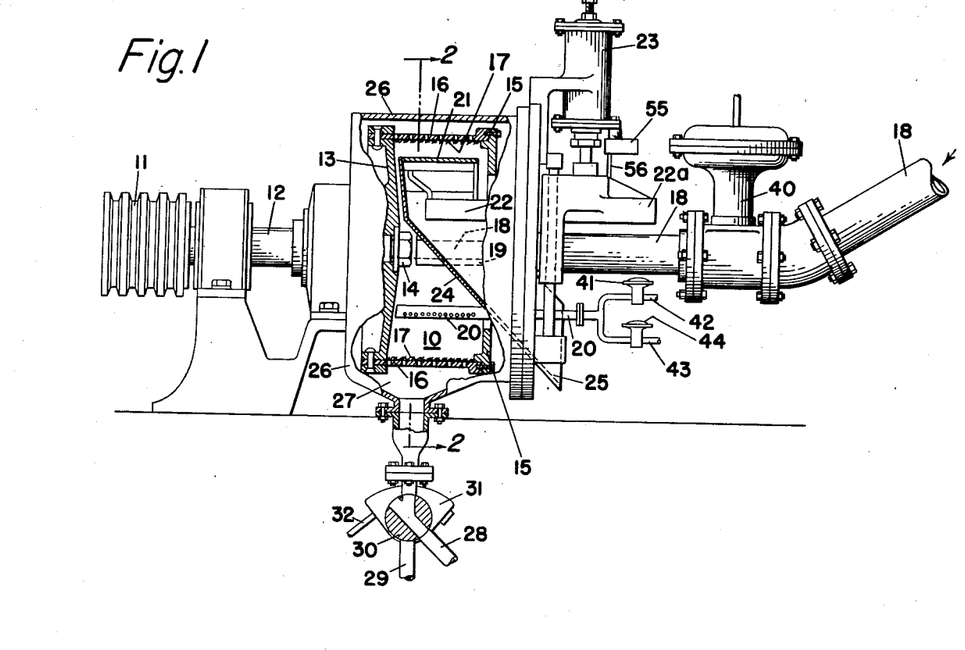
Figure 1 is a side elevation with parts cut away and parts in section of a centrifugal machine of a type to which the invention has been applied.
Figure 2:
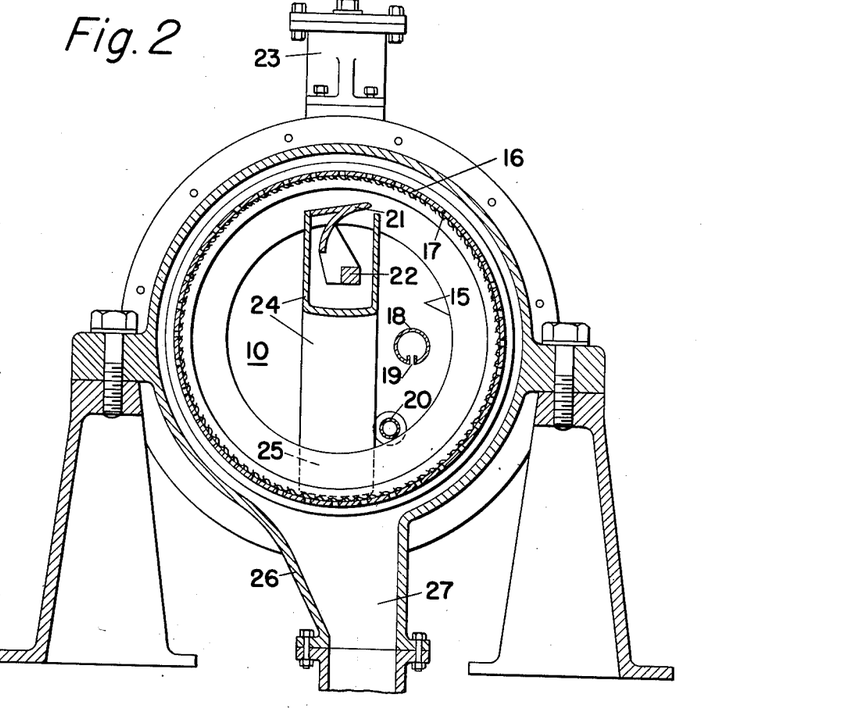
Figure 2 is a sectional view taken on the line 2—2 of Figure 1.

The centrifugal machine illustrated in Figures 1 and 2 has a rotor 10 which is rotated from a suitable source of power, as by a grooved driving pulley 11 which is connected to the rotor through a shaft 12. One side of the rotor 10 comprises a disc 13 connected to the shaft 12 by a suitable nut 14. The other side of the rotor 10 comprises an annulus 15 which has a circular opening in its center. A perforated wall 16 forms the circumference of the rotor. For most applications, the wall 16 will be covered by a mesh screen 17 of one or more thicknesses. A feed conduit 18 having a longitudinal feed slot 19, Figs. 1 and 2, is provided through which a mixture of liquid and solids may feed into the rotor. A rinse liquid conduit 20 extends parallel to the axis of the rotor 10 to a point adjacent to the disc 13. A scraper or dislodging device 21 may be advanced radially of the rotor toward the perforated wall 16 by a suitable arm 22 carried by a yoke 22a which is moved by a fluid motor 23 preferably hydraulically operated. A hopper or chute 24 directs solids which are dislodged from the wall 16 of the rotor by the scraper 21 into a zone 25 of discharge from the machine.

A housing or casing 26 of the centrifugal machine collects liquid separated from solids in the rotor and discharged through the screen 17 and perforated wall 16. A housing drain 27 may be provided with two or more separate discharge conduits 28 and 29. A three-way valve 30 actuated by a fluid motor 31 controls the flow of liquid through these discharge conduits. As shown, this valve 30 in one position connects the housing drain 27 with one discharge conduit 28; in the other position it connects the housing drain with the other discharge conduit 29.

Figure 5:
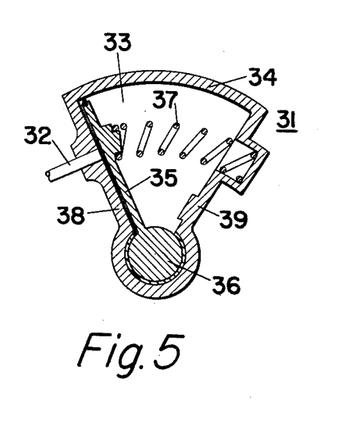
Figure 5 is a sectional view of a fluid motor shown in Figure 1.

The fluid motor 31 which actuates the three-way valve 30 may be constructed as illustrated in Figure 5. Fluid conduit 32 connects to a chamber 33 formed inside of a housing 34. A plate valve 35 inside the chamber 33 is connected to a shaft 36 which in turn is connected to, or integral with, the three-way valve 30, Fig. 1. Spring 37 tends to force the plate valve 35 against a wall 38 of the housing 34; fluid pressure when admitted through the conduit 32 forces the plate valve toward an opposite wall 39 of the housing 34. As the plate valve is forced across the chamber under either fluid pressure or spring pressure, the shaft 36 is turned through a part of a revolution. As the shaft 36 turns, the three-way valve 30 turns with it. Thus, in one position of the plate valve 35 there is a fluid connection from the housing drain 27 into one discharge conduit 28; in the other position of the plate valve the discharge conduit 29 is connected with the housing drain 27 through the valve 30. Obviously, separate fluid operated valves in each of the conduits 28 and 29 could be used instead of the three-way valve 30 and fluid motor 31, or a four-way valve could be employed to discharge three liquids through separate conduits.

The feed conduit 18, Fig. 1, has a fluid-actuated feed valve 40 which controls the flow of the mixture of liquid and solids into the rotor. A fluid-actuated valve 41 controls the flow of cake rinsing liquid from supply conduit 42 into the rotor through the rinse liquid conduit 20. It is obvious that conduits for more than one rinse liquid, each controlled by a fluid-actuated valve, could be employed here joining into the rinse liquid conduit 20. For example, a water rinse might be applied to the cake of solids before removal, and steam rinse to the wall of the rotor after removal. As shown, a steam rinse, hot water, a solvent or the like may also be introduced through conduit 20 by way of supply line 43 and a fluid-actuated valve 44. The particular screen rinse used will be selected in terms of the character of the layer left on the screen 17.

Figure 6:
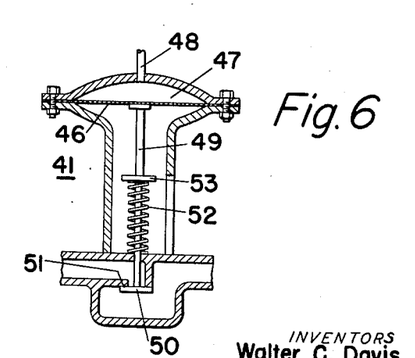
Figure 6 is a sectional view of one embodiment of a fluid-actuated valve used in connection with the machine of Figure 1.

Each of the actuating valves 40, 41, 44 and 45 are of like construction, except valve 45 is normally open. One of them, the valve 41, is illustrated in section in Fig. 6. It includes fluid operating means comprising a diaphragm 46 which is deflected downwardly when fluid under pressure is permitted to enter chamber 47 from the conduit 48. A rod 49 is connected to the diaphragm 46 and to a valve disc 50. Normally, this disc is held tightly against the valve seat 51 under the pressure of a spring 52 acting against an upset portion 53 of the rod 49. When the diaphragm 46 is deflected downwardly under fluid pressure, the spring 52 is compressed and the valve disc 50 moves away from the seat 51 to open the valve. When the fluid pressure is removed from the diaphragm, the valve closes under pressure of the spring 52. The valve 45 normally closed by spring 52 is opened by fluid pressure on its actuating diaphragm.

An unloader limit switch 55 is operated by a rod 56 attached to the scraper supporting yoke 22a. The circuit controlled by the switch 55 is broken when the scraper 21 approaches as close as is desirable to the screen 17 or wall 16 of the rotor. The circuit is completed by the switch 55 as soon as the scraper 21 moves in the reverse direction.

The manner in which the various component parts cooperate together will now be described in connection with the diagrammatic illustration of the system as embodied in Fig. 3. The valves 40, 41, 44 and 45, together with the actuator 31, have been illustrated. All valves are operated from a suitable source of fluid supply indicated by the conduit 60, the pressure of the fluid in the line being indicated by a pressure gauge 61. The fluid-actuated valves are under the control of solenoid-operated valves which will in turn be referred to with reference to the electrical system.

To initiate operations a line switch 62 is closed to connect supply lines 63 and 64 to suitable sources of current indicated by supply lines L–1 and L–2. It will be observed that the circuit of supply line 63 is completed through the limit switch 55 which in Fig. 1 is shown to be operated by the rod 56, in Fig. 3 indicated by a broken line. The operating coil 65 of a timer 66 is energized and serves to actuate an operating member 67 which produces engagement of a clutch 68 and moves contact members 69, 70 and 71 toward circuit-closing positions. The contacts 69 and 71 complete circuits through cooperating contacts 72 and 73, but since the contact member 74 is in its lowermost position a circuit through contact 70 is not complete. The closure of the circuit through contacts 69 and 72 completes an energizing circuit for a timer-driving motor 75 which is preferably of a synchronous type. The closure of a circuit through the contact members 71 and 73 energizes the operating coil 76 of a valve 77 which connects through line 78 the fluid valve 44 to the fluid supply conduit 60. Accordingly, the screen rinse fluid-actuated valve 44 operates to connect the line 20 to a source of rinsing fluid indicated by conduit 43, which fluid then flows through the plurality of openings into the rotor, which, it will, of course, be understood, is rotating at suitable speed. The screen rinse fluid will be selected in accordance with the character of the cake remaining on the screen. If the cake is paradichlorobenzene, steam will be preferred as the screen rinse. For acetylsalicylic acid, a suitable solvent such as hot water will be utilized as the screen rinse. Naphthalene will best be removed from the screen by jets of hot water directed upon it with substantial velocity. On the other hand, for sodium hydrosulphite the screen rinse will preferably be a solvent such as alcohol. The foregoing examples are to be taken as illustrative since, in accordance with the present invention, a wide variety of materials may be separated, and the apparatus may be maintained in operation over long periods of time without need for shut-down manually to scrape and clean an imperforate layer from the screen 17.

The timer unit 66 is preferably of the type disclosed in Anderson Patents 2,175,864 and 2,175,865. The timer 66 may be readily and quickly adjusted to predetermine the length of time between the closure of the circuits through contacts 69 and 72, and 71 and 73, and the closure of a circuit through the contacts 70 and 74. In other words, the time during which screen rinsing occurs is predetermined by the setting of the timer 66. As diagrammatically illustrated, the motor 75, after engagement of clutch 68, rotates a shaft 79 upon which are mounted operating cams 80, 81 and 82. At the end of the predetermined time interval, the cam-followers on the contacts 72 and 73 move from the crests to the troughs of cams 80 and 82, while the camfollower on the contact 74 moves from the trough onto the crest, thus closing the circuit through contacts 70 and 74. The opening of the circuits through the contacts 69 and 72 and through contacts 71 and 73 respectively deenergizes the motor 75 and the coil 76. The motor immediately stops and the valve 77 is returned to its illustrated position to connect the fluid-actuated valve 44 to atmosphere through a conduit 83. Accordingly, the valve 44 is moved by its actuating spring (shown in Fig. 6) to closed position.

The circuit through contacts 70 and 74 energizes the operating coil 84 of a second timer 85. This timer, as well as timers 86 and 87, may be and preferably are of identical construction with timer 66. While each timer has been illustrated as including three cams 80, 81 and 82, in the form of the device illustrated in the aforesaid Anderson patents, only one cam need be included, this serving to operate a switch-actuating plate to produce the same operation which, in Fig. 3, has been diagrammatically illustrated. Since the remaining timers are of construction like timer 66, only the necessary elements thereof will be identified with reference characters in the following description.

Returning to the operation, the energization of the operating coil 84 serves to engage the clutch and to close contacts 88 and 89 which respectively energize the motor and the operating coil 90 of a valve 91. Valve 91 is thereupon actuated to connect the supply line 60 to a manifold 92 for application of fluid pressure to the fluid motor 31 for the housing drain valve and to the fluid-actuated feed valve 40. As already described, the fluid motor 31, Fig. 1, serves to connect the outlet from the housing or casing to one or the other of outlet conduits 28 and 29. As illustrated, the rinse liquid will have passed through the outlet conduit 28 while, after actuation of the fluid motor 31, the mother liquor will exit by way of the conduit 29, thus separating the rinse fluid from the mother liquor. While the coil 90 is energized, the material to be separated will flow through the supply line 18 and into the rotor. Mother liquor as it is segregated from the solids will flow outwardly through the conduit 29. When enough material to be separated has entered the rotor 10, the timer 85 will trip, that is, it will open its contacts 88 and 89 and close its contacts 93. The feed valve 40 will immediately close, and the drain valve 31 will return to the position shown in Fig. 1. Through the circuit completed through the contacts 93, the operating coil 94 of the timer 86 will be energized to engage the clutch and to close the contacts 95 and 96, the former energizing the motor and the latter completing an energizing circuit for the operating coil 97 of a valve 98 which is operated to connect the cake rinse valve 41 to the fluid supply line 60. Accordingly, cake rinsing liquid will flow through supply conduit 42, through the valve and into the line 20. The cake rinse liquid will be distributed through the openings in the line 20 for flow contact with the cake then present in the rotor 10. After the cake rinsing liquid has flowed for a sufficient interval of time to wash the cake to the desired degree, the timer 86 will trip to open its contacts 95 and 96 and to close its contacts 99. It will be observed that the closure of contacts 99 energizes the coil 100 of the timer 87 which serves to close contacts 101 and 102, the latter being shown merely to indicate that the timer 87 is of like construction with the previously described timers. Contacts 102 are not utilized because it is desired to provide a time interval after deenergization of the valve 97 by opening of contacts 96 for continued centrifugation of the cake after cessation of flow of cake rinsing liquid. The continued period of centrifugation ends with the tripping of timer 87 and the closure of its contacts 103. They complete the circuit for the operating coil 104 of a valve 105 which controls the application of fluid from the supply line 60 to the unloader valve 45. The latter valve then closes a circulatory line 106 through which a pump 107 is normally effective to circulate hydraulic liquid as to and from a supply tank 108. When valve 45 closes, the fluid pump 107 applies a rising pressure to the hydraulic actuator or fluid motor 23 to raise the yoke 22a and the scraper 21 mechanically connected thereto, Fig. 1. As the scraper rises, it engages the cake which is thereby progressively dislodged and directed into the hopper or chute 24 and removed from the rotor. The scraper 21 continues to move upwardly until it closely approaches the screen 17. Its upward movement is safely terminated short of engagement with the screen 17 by engagement of the yoke 22a with a stop (not shown) forming a part of the frame. At the same time the limit switch 55 opens to deenergize the supply line 63. Before opening of limit switch 55, it will be recalled that the operating coils of the respective timers have been energized. However, when limit switch 55 opens, the respective operating coils are deenergized, and the spring-biased actuating members serve to disengage the respective clutches. Thereupon a spring, such for example as the spring 109' of the timer 66, is effective to rotate the shaft 79 and its cams to the position illustrated in Fig. 3. This happens simultaneously for the respective timing devices, and thus the parts are returned to the positions illustrated in Fig. 3 and the cycle is repeated, beginning with the time-rinsing of screen 17.

By the time-rinsing of the screen after each separation of solids from liquids, the imperforate layer which remains on the screen 17 is rendered perforate by the screen rinsing fluid. By starting each batch operation with a perforate or relatively clean screen 17, the separating efficiency is maintained high through long continued operation of the system. Accordingly, a machine of the type shown in the aforesaid Brewer Patent 2,271,493 is not only greatly improved in its operating efficiency over long periods of time, but such usefulness has been extended to materials which tend quickly to clog the screen.

If, during automatic operation an abnormal situation should arise which makes it desirable immediately to unload the rotor 10, actuation of a manually operable switch 109 completes a circuit for the operating coil 104 for immediate operation of the hydraulic unloader 23. This manually operable switch 109 may also be used in starting the machine or, in general, for checking purposes. When a new material is to be treated or separated, it is frequently convenient to operate a transfer switch 110 to render effective manually operable switches 111—113 for control respectively of the operating coils 76, 90 and 97. Accordingly, each operation may be initiated manually and for any desired length of time. This is particularly convenient to establish the most desirable timing periods for each of the timers to set up an automatic cycle which, upon return of the transfer switch 110 to its illustrated position, will be cyclically carried out for as long as may be desired.

For some materials the relatively thin layer which remains on the screen 17 after discharge of the solids is not sufficiently opaque to fluid flow as to greatly decrease the efficiency, but after a number of cycles of operation, its resistance to flow of liquid therethrough rises and, of course, the operating efficiency correspondingly decreases. For such materials, it is not necessary to apply a screen rinse between each batch. Moreover, from consideration of overall operating efficiency, the total output of the machine will be greater if a plurality of separating operations are undertaken prior to the application of the rinsing liquid since the operating time of the machine is made greater by the time saved by eliminating the rinsing operation in each cycle. Where there is need for separation between the screen rinsing fluid and the motor liquor, it will also be frequently desirable to separate a plurality of batches of solid materials before application of the screen rinsing fluid. Where the screen rinsing fluid is of a relatively expensive character such as alcohol, there will also be effected substantial saving by screen rinsing only as frequently as may be needed to maintain reasonably satisfactory the separating efficiency.

Figure 4:
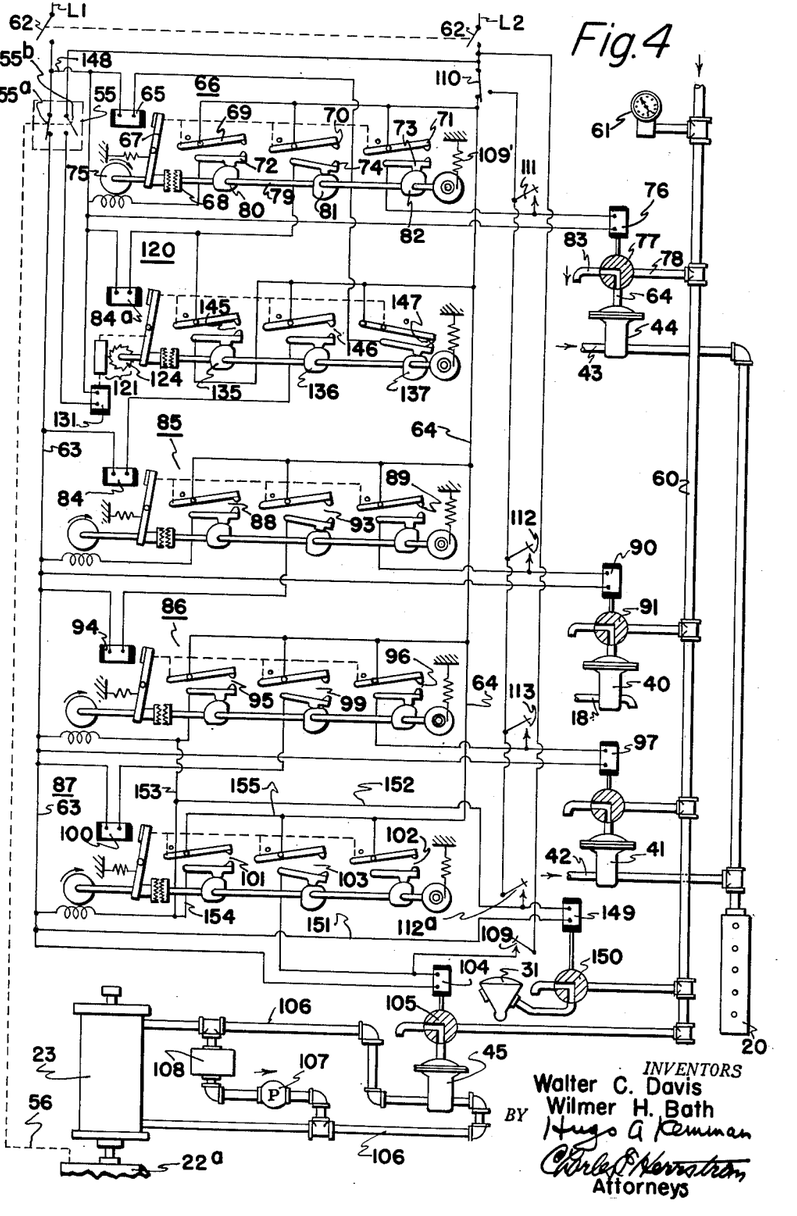
Figure 4 is a schematic diagram of the electro-mechanical controls and fluid-actuating system of another embodiment of the invention.

Further in accordance with the invention, the system of Fig. 4 is particularly suited for general application and to take care of the many requirements just discussed.

Referring now to Fig. 4, there has been provided in the control system intermediate the timers 66 and 85 a ratchet-operated cycle-counting switch mechanism 120 which may be structurally the same as the timers except for the replacement of the motor by a ratchet mechanism 121.

Figure 7:
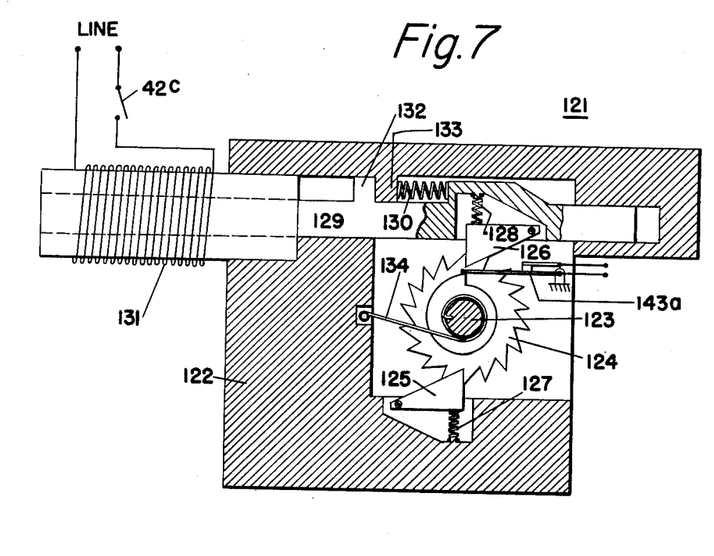
Figures 7 and 8 are sectional views of one embodiment of the cycle-counting mechanism employed in the electro-mechanical system shown in Figure 4.
Figure 8:
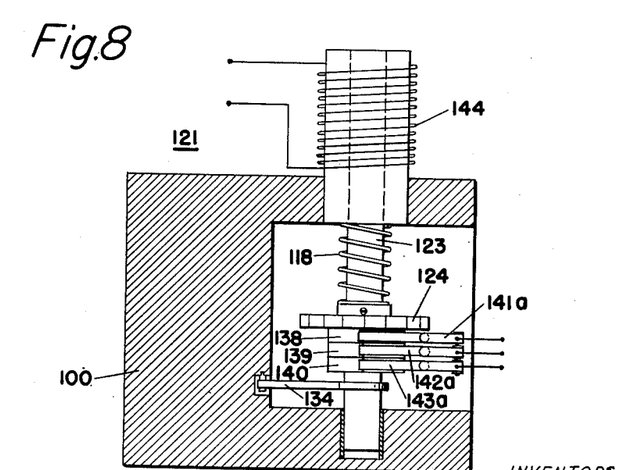

One embodiment of the solenoid-operated ratchet-counter mechanism 121 is shown in Fig. 7. Stationary housing 122 rotatably supports the shaft 123. Mounted on this shaft is a ratchet wheel 124. Pawls 125 and 126 engage the teeth of the ratchet wheel or disc 124 under pressure of the springs 127 and 128. The pawl bar 129 which is normally held to the right, as illustrated in Fig. 7, by a spring 130 carries the pawl 126 and its spring 128. When the operating coil 131 is energized, it moves the pawl bar 129 to the left against the bias of the spring 130. This movement of the pawl bar 129 is sufficient to turn the ratchet wheel 124 through one tooth position. When the coil 131 is deenergized, the pawl bar 129 is returned to its original position by the spring 130. A lug 132 on the pawl bar 129 acts against a stop-projection 133 on the stationary housing 122 to prevent excessive movement of the pawl bar under the force of the spring 130. While the pawl bar 129 is being returned to its original position, the pawl 125 under pressure of the spring 127 engages the ratchet wheel 124 and prevents rotation of this wheel under force of a spring 134. As soon as the ratchet wheel 124 has advanced the desired number of tooth positions following a selected corresponding number of cycles of operation of the apparatus as a whole, the cams 135, 136 and 137 which operate the respective contacts are moved from their illustrated positions to their other switch-actuating positions. In the foregoing description of Fig. 7, the arrangement described illustrates the ease of substituting the ratchet mechanism 121 of Fig. 7 for the motor of a typical timing unit.

Where it is desired to utilize a different type of ratchet-operated cycle-counting switching mechanism, the device of Fig. 7 may incorporate additional features as illustrated in Fig. 8. Accordingly, the shaft 123 may carry cams 138, 139 and 140. These cams may be arranged to operate switch contacts 141a—143a. Upon energization of the reset coil 144, the shaft 123 is moved axially and upwardly, as viewed in Fig. 8, to move the ratchet wheel 124 out of engagement with the pawls 125 and 126. As soon as the ratchet wheel is free of them, it is rotated by the spring 134 to return the cams 138—140 to their initial positions.

Figure 3:
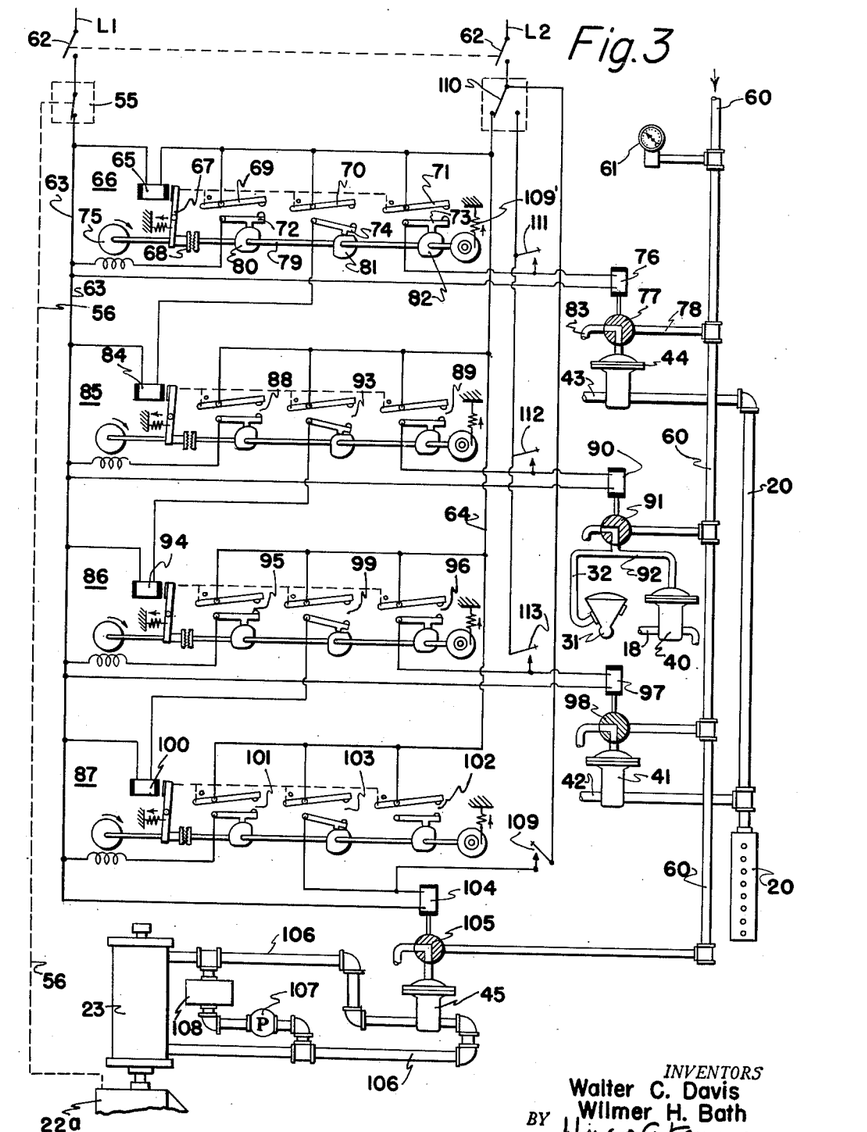
Figure 3 is a schematic diagram of the electro-mechanical controls and fluid-actuating system employed in one embodiment of the invention.

Returning now to Fig. 4, corresponding parts have been given the same reference characters as in Fig. 3. Upon closure of the line switch 62, the timer 66 will be actuated to supply screen rinsing liquid to the rotor 10. When the timer 66 trips, an energizing circuit will be completed through its contacts 70 and 74 to the operating coil 84a of the switching mechanism 120. Upon energization of coil 84a, the contacts 145 and 146 are closed, while the contacts 147 of mechanism 120 are opened to interrupt the circuit of operating coil of timer 66. Since the contacts 147 remain open until cycle-counter 120 trips, there will be no further screen rinsing during the subsequent cycles which are completed by timers 85, 86 and 87. The closure of contacts 145 completes a holding circuit for the coil 84a while the closure of contacts 146 energizes the operating coil of timer 85 which begins its timing operation. The remaining operations may be, and sometimes preferably are, identical with those described in connection with Fig. 3. Assuming they are, then upon completion of the feeding period, the cake rinsing period, the period of drying and unloading, the limit switch 55 is actuated to open normally closed contacts 55a and to close normally open contacts 55b. The opening of the former contacts serves the same function as in Fig. 3, but the closure of contacts 55b serves to complete an energizing circuit for the coil 131 of the ratchet mechanism to cause the wheel 124 to be advanced one step. As before, the opening of contacts 55a deenergizes the unloading coil 104, thus resulting in the return of the unloader by the actuator 23 to the position illustrated in Fig. 1. Accordingly, contacts 55a close and contacts 55b open for resumption of a further cycle of operations identical with those above described except that the operating coil 84a has remained energized, since its energizing circuit is derived from conductor 148 which, it will be observed, is on the line-side of unloader switch 55. Accordingly, the timer 66 remains inoperative, and the cycle of operations is resumed by reason of the energizing circuit completed through the contacts 146 for the operating coil 84 of the timer 85. When the cycles are repeated in number adequate to produce tripping of the ratchet-operated switching mechanism 120, the contacts 145 and 146 are open, while the contacts 147 are closed. This operation brings into the cycle a further screen rinsing period which precedes the resumption of the next series of operations.

This brief resume of operation has been given since there are specific differences in Fig. 4 incorporated to illustrate a further modification of the invention and to indicate further applications of the invention. More specifically, when it is desired to permit commingling of the screen rinsing fluid with the mother liquor, but to separate what may in some cases be a relatively costly cake rinse, the arrangement of Fig. 4 may be utilized.

This different separation is obtained by providing a separate operating coil 149 and valve 150 for the casing drain-actuator 31 and connecting the coil 149 in a circuit under the joint control of timers 86 and 87. More particularly, the coil 90 and valve 91 remain under the control of contacts 89 of timer 85, as in Fig. 3. Accordingly, the feed valve is opened to introduce material into the rotor 10. At the end of the time interval, the timer 86 through its contacts 95 energizes the coil 149 to produce operation by the fluid motor 31 to connect the drain to the outlet conduit 29. At the same time, the contacts 96 of timer 86 complete the energizing circuit for the coil 97 for introduction of rinsing liquid. Thus, it will be seen that the cake rinsing liquid leaves the casing or housing by way of the conduit 29, while the screen rinsing liquid and the mother liquor will leave by way of the conduit 28. Another difference in operation is that after the timer 86 trips to open its contacts 96 for closure of the cake rinsing valve 41, the fluid motor 31 under control of coil 149 continues to hold the valve 30 in position to connect the casing to the conduit 29. This is accomplished since upon energization of the coil 100 the contacts 101 complete an energizing circuit which may be traced from supply line 63 by way of conductor 151, operating coil 149, conductors 152, 153 and 154, contacts 101 and by conductor 155 to the other supply line 64. In this manner, all of the cake rinsing liquid which is removed from the cake by the additional centrifugation is removed by way of conduit 29.

In some applications of the invention, as when there is a feed of slurry consisting of naphthalene and its mother liquor, the number of cycles before a screen rinse may be of a low order, in the neighborhood of four, while for slurries including paradichlorobenzene operation may continue for a relatively large number of cycles before screen rinsing becomes necessary, for example, of the order of fifty cycles. Thus, screen rinsing may occur in every cycle, as in Fig. 3, or it may be delayed for fifty or more cycles as may be desired and as will best suit the requirements of the operation. Similarly, the screen rinsing time may vary from a fraction of a second to fifteen seconds or more, and the period for washing of the cake will depend upon the requirements of the final product and may vary from one second to thirty seconds or more. As a further example, in the separation of ammonium-sulphate crystals from mother liquor, the screen rinse cycle-counter 120 may be set for twelve cycles of operation before rinsing occurs. Screen rinsing may then be maintained for a period of fifteen seconds, while cake rinsing may only require three seconds.

The combination of the timers, the electromechanical means and the fluid actuation all co-operate to provide a relatively simple, dependable and trouble-free system which has proven to be highly satisfactory.

From the several modifications which have been described in detail, it will now be apparent that the invention has a wide variety of applications and that certain features may be utilized with or without certain other features and that with the instructions given, further modifications may be made within the scope of the appended claims.

What is claimed is:

1. In a centrifugal machine for separating liquid from solids having a rotor, a valve controlling the feed of a mixture of liquid and solids into said rotor, a perforated wall in said rotor for the discharge from said rotor of liquid centrifugally separated therein from solids, means for discharging solids from said rotor, the combination of a rinse conduit to supply rinse fluid into said rotor, a valve in said rinse conduit to control the flow of rinse fluid, first electro-mechanical means controlling said rinse conduit valve to open it after the solids have been discharged from said rotor and to close it after a predetermined period of rinsing, second electro-mechanical means set in motion by said first means, said second means controlling said mixture feed valve to open said feed valve after said rinse conduit valve has been closed and to close said feed valve after a predetermined time of feeding mixture into the rotor, third electro-mechanical means set in motion by said second means, a second rinse valve, said third means controlling said second rinse valve to open it after said feed valve has closed and to close it after a predetermined period of rinsing the solids in said rotor, fourth electro-mechanical means set in motion by said third means after completion of said rinsing of said solids, said fourth means controlling said means for discharging solids from said rotor to operate said solids discharge means after said solids have been subjected to centrifugation for a predetermined period and to render said discharge means temporarily inoperative after said solids have been discharged, and an electro-mechanical means operative to by-pass said first electro-mechanical means for a predetermined number of feed and discharge cycles, said electro-mechanical cycle-counting means acting when said first electro-mechanical means is by-passed, to set in motion said second electro-mechanical means after said solids have been discharged.

2. In a centrifugal machine for separating liquid from solids having a rotor, a valve controlling the feed of a mixture of liquid and solids into said rotor, a perforated wall in said rotor for the discharge from the rotor of liquid centrifugally separated therein from solids, and means for discharging solids from said rotor, the combination of a rinse conduit to supply rinse fluid into said rotor, a valve in said rinse conduit to control the flow of rinse fluid, first electro-mechanical means controlling said rinse conduit valve to open it after the solids have been discharged from said rotor and to close it after a predetermined period of rinsing, second electro-mechanical means set in motion by said first means, said second means controlling said mixture feed valve to open said feed valve after said rinse conduit valve has been closed and to close said feed valve after a predetermined time of feeding mixture into the rotor, third electro-mechanical means set in motion by said second means, a second rinse valve, said third means controlling said second rinse valve to open it after the feed valve has closed and to close it after a predetermined period of rinsing the solids in the rotor, and fourth electro-mechanical means set in motion by said third means, said fourth means controlling said means for discharging solids from said rotor to operate said solids discharge means after said solids have been subjected to centrifugation for a predetermined period and to render said discharge means temporarily inoperative after said solids have been discharged, and a ratchet-operated cycle counter for setting into operation said second means without setting into operation said first means until completion of a selected number of cycles.

3. In a centrifugal machine for separating liquid from solids having a rotor, a valve controlling the feed of a mixture of liquid and solids into said rotor, a perforated wall in said rotor for the discharge from the rotor of liquid centrifugally separated therein from solids, and means for discharging solids from said rotor, the combination of a rinse conduit to supply rinse fluid into said rotor, a valve in said rinse conduit to control the flow of rinse fluid, first electro-mechanical means controlling said rinse conduit valve to open it after the solids have been discharged from said rotor and to close it after a period of rinsing, second electro-mechanical means set in motion by said first means, said second means controlling said mixture feed valve to open said feed valve after said rinse conduit valve has been closed and to close said feed valve after feeding a quantity of mixture into the rotor, third electro-mechanical means set in motion by said second means, a second rinse valve, said third means controlling said second rinse valve to open it after said feed valve has closed and to close it after a predetermined period of rinsing the solids in said rotor, fourth electro-mechanical means set in motion by said third means after completion of said rinsing of said solids, said fourth means controlling said means for discharging solids from said rotor to operate said solids discharge means after said solids have been subjected to centrifugation and to render said solids discharge means temporarily inoperative after said solids have been discharged, and electro-mechanical means including a ratchet-operated cycle counter operative to by-pass said first electro-mechanical means for a number of feed and discharge cycles, said electro-mechanical means including said cycle counter acting when said first electro-mechanical means is by-passed to set in motion said second electro-mechanical means after said solids have been discharged.

4. In a centrifugal machine which separates liquid from solids having a rotor, a valve controlling the feed of a mixture of liquid and solids into said rotor, a perforated wall in said rotor for the discharge from said rotor of liquid centrifugally separated therein from solids, and means for discharging solids from said rotor, the combination of a rinse conduit to supply rinse fluid into said rotor, a valve in said rinse conduit to control the flow of rinse fluid, a housing adjacent said rotor to collect liquid discharged from said rotor, means including separate discharge conduits and a discharge valve selectively opening and closing them, first electro-mechanical means controlling said rinse conduit valve to open it after the solids have been discharged from said rotor and to close it after a predetermined period of rinsing, second electro-mechanical means set in motion by said first means, said second means controlling said mixture feed valve to open said feed valve after said rinse conduit valve has been closed and to close said feed valve after a predetermined time of feeding mixture into the rotor, third electro-mechanical means set in motion by said second means, a second rinse valve, said third means controlling said second rinse valve to open it after the feed valve has closed and to close it after a predetermined period of rinsing the solids in the rotor, and fourth electro-mechanical means set in motion by said third means, said fourth means controlling said means for discharging solids from said rotor to operate said solids discharge means after said solids have been subjected to centrifugation for a predetermined period and to render said discharge means temporarily inoperative after said solids have been discharged, a ratchet-operated cycle counter for setting into operation said second means without setting into operation said first means until completion of a selected number of cycles, and at least one of said electro-mechanical means including structure for controlling said discharge valve to close one of said conduits and to open the other of said conduits for selective flow through them of liquid collected by said housing.

WALTER C. DAVIS.
WILMER H. BATH.

References Cited in the file of this patent

UNITED STATES PATENTS

| Number | Name | Date |
|---|---|---|
| 433,339 | Forbes | July 29, 1890 |
| 535,306 | Stewart | Mar. 5, 1895 |
| 643,667 | De Marcleville | Feb. 20, 1900 |
| 911,469 | Boyd | Feb. 2, 1909 |
| 946,476 | Warner | Jan. 11, 1910 |
| 1,253,428 | Salcines | Jan. 15, 1918 |
| 1,343,078 | Carter | Jan. 8, 1920 |
| 1,669,927 | Carlson | May 15, 1928 |
| 1,748,165 | Athenstedt | Feb. 25, 1930 |
| 1,939,183 | Neuman | Dec. 12, 1933 |
| 1,965,840 | Jones | July 10, 1934 |
| 1,984,302 | De Vries | Dec. 11, 1934 |
| 2,037,655 | Roberts | Apr. 14, 1936 |
| 2,138,476 | Jones | Nov. 29, 1938 |
| 2,271,493 | Brewer | Jan. 27, 1942 |
| 2,368,876 | Terradas | Feb. 6, 1945 |